(12) United States Patent  (10) Patent No.: US 7,143,860 B2
Marks et al.  (45) Date of Patent: Dec. 5, 2006

(54) TILTABLE STEERING APPARATUS AND METHOD FOR SNOWMOBILES, ALL-TERRAIN VEHICLES, AND OTHER VEHICLES USING HANDLEBARS AS STEERING MECHANISMS

(76) Inventors: Dennis R. Marks, 1456 Sharon Pkwy., Shakopee, MN (US) 55379; John R. Lind, 13 Woodcrest Dr., Burnsville, MN (US) 55337

( * ) Notice: Subject to any disclaimer, the term of this patent is extended or adjusted under 35 U.S.C. 154(b) by 473 days.

(21) Appl. No.: 10/791,254

(22) Filed: Mar. 2, 2004

(65) Prior Publication Data

US 2005/0194199 A1  Sep. 8, 2005

(51) Int. Cl.
*B62D 1/14* (2006.01)
(52) U.S. Cl. .................. 180/332; 74/493; 74/551.2; 74/551.3; 180/190; 180/210; 248/218.4; 248/274.1; 280/275; 280/775; 280/779
(58) Field of Classification Search ............ 180/332, 180/334, 315, 190, 191, 210; 280/771, 775, 280/779, 275; 74/551.1, 551.2, 551.3, 551.4, 74/551.5, 493; 248/674, 675, 122.1, 123.11, 248/125.9, 201, 202.1, 218.4, 274.1, 276.1, 248/284.1, 288.11, 291.1, 291.11, 299.1
See application file for complete search history.

(56) References Cited

FOREIGN PATENT DOCUMENTS

| JP | 58-85757 | * | 5/1983 | .................. 74/493 |
| JP | 2-225176 | * | 9/1990 | .................. 74/493 |
| JP | 5-162677 | * | 6/1993 | ................. 180/210 |

* cited by examiner

*Primary Examiner*—Eric Culbreth
(74) *Attorney, Agent, or Firm*—Craig Gregersen

(57) ABSTRACT

The present invention provides a handlebar tilting apparatus having upper and lower pivotally attached brackets, a lever, and appropriate connectors to fasten the brackets and lever to each other in accordance with the present invention. In the embodiment shown and described herein, the brackets each adopt a generally U-shaped configuration with opposing side members and a transition member extending therebetween and integral therewith. The lower bracket is stationary and is attached to the steering column of a vehicle using a handlebar for steering. The upper bracket is attached to the handlebar of the vehicle. The lever is pivotally attached to the upper bracket by a lever pin and supports a latch pin that selectively engages notches disposed in the lower bracket. Pivoting the lever relative to the upper bracket engages and disengages the latch pin with respect to the notches in the lower bracket sides, thus allowing the upper bracket to pivot forwardly and rearwardly relative to the lower bracket and the vehicle, thereby pivoting the handlebar carried by the upper bracket relative to the vehicle and its operator.

22 Claims, 3 Drawing Sheets

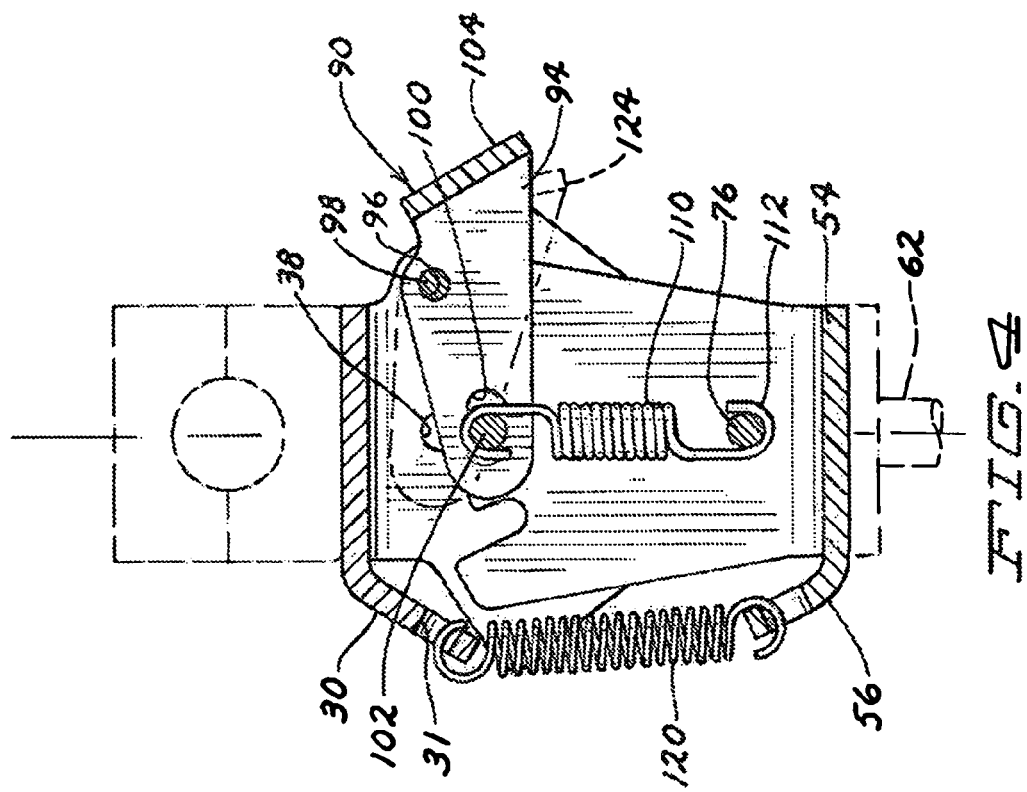
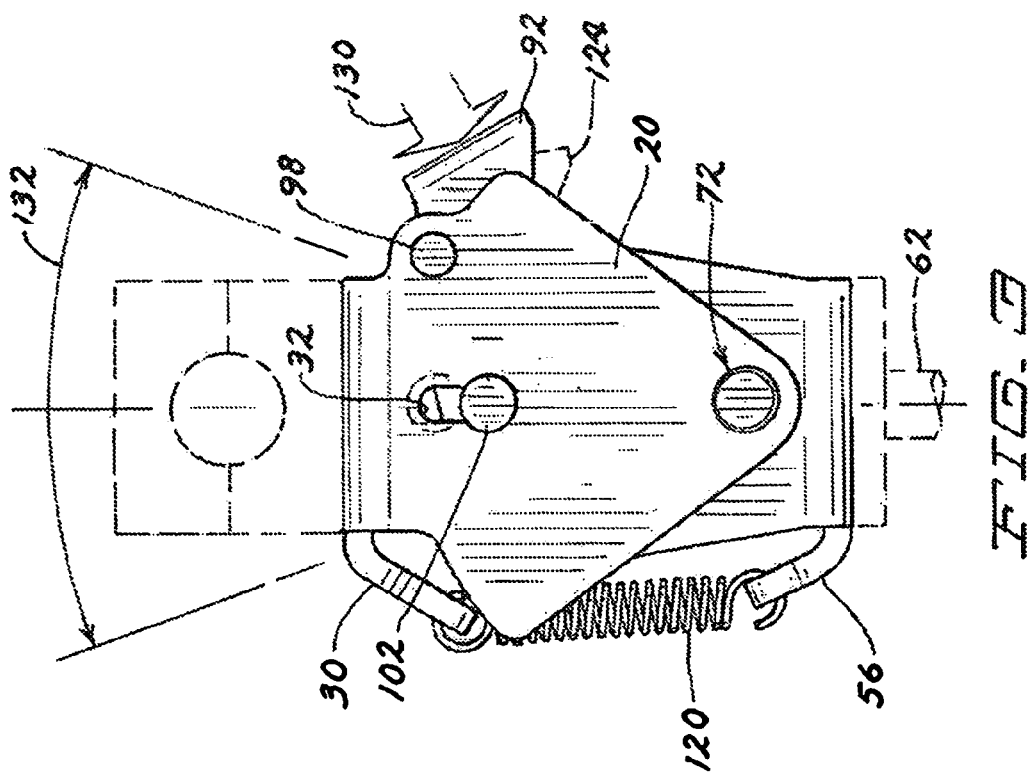

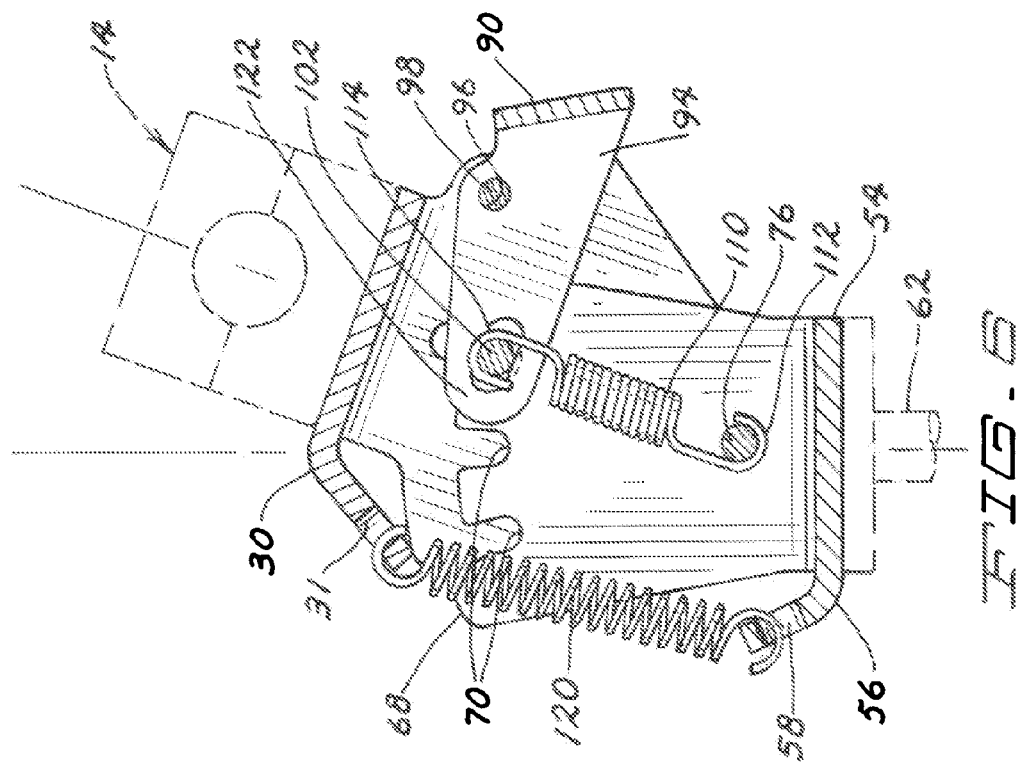
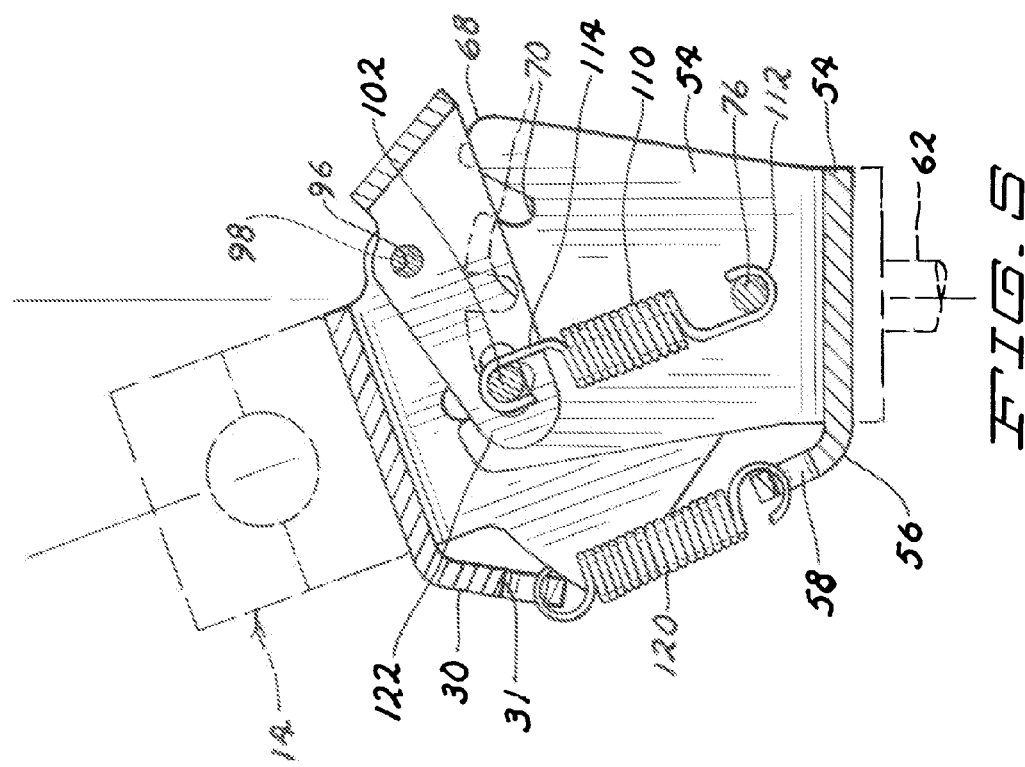

TILTABLE STEERING APPARATUS AND METHOD FOR SNOWMOBILES, ALL-TERRAIN VEHICLES, AND OTHER VEHICLES USING HANDLEBARS AS STEERING MECHANISMS

BACKGROUND OF THE INVENTION

The present invention relates to apparatus and method for providing a tiltable steering handlebar for vehicles such as snowmobiles and all-terrain vehicles (ATVs).

The steering mechanisms currently sold for snowmobiles and ATVs are nearly universally in the form of a handlebar. Furthermore, these handlebars have a nearly universal "one-size, one-position-fits-all" construction. That is, the handlebars are unable to tilt to provide increased comfort for the operator as well as increased safety in the operation of a snowmobile or ATV.

The tilt mechanisms currently used to provide a tilting action to automobile steering wheels are configured to receive therethrough the steering column and do not rotate as the steering wheel is rotated. That is, this form of tilt apparatus is fixed relative to the vehicle and allows the steering shaft to rotate relative thereto. This apparatus is not conducive to use on a snowmobile or similar vehicles with handlebar steering designs without alterations to the configuration of the snowmobile or other vehicle.

It would be desirable to have a tiltable steering handlebar on a snowmobile or ATV to enable the operator to dispose the handlebar in a position that affords the operator increased comfort in the operation of the snowmobile or ATV and increases operational safety as a result and that does not require significant alterations to the snowmobile or ATV or significant increased costs.

BRIEF DESCRIPTION OF THE INVENTION

It is an object of the present invention to provide new and useful apparatus that is not subject to the previously recited limitations of the prior art.

It is another object of the present invention to provide increased comfort for the operator of a snowmobile, ATV or other motorized vehicle that utilizes a handlebar for steering.

It is still another object of the present invention to increase the ability of an operator to safely and reliably operate a snowmobile, ATV, or other vehicle that utilizes a handlebar for steering.

It is yet another object of the present invention to provide apparatus for adjusting the tilt of the handlebar of a snowmobile, ATV, or other motorized vehicle that utilizes a handlebar for steering.

It is still yet another object of the present invention to provide apparatus for adjusting the tilt of the handlebar of a snowmobile, ATV, or other motorized vehicle that utilizes a handlebar for steering without incurring significant costs or requiring significant alterations to the vehicle.

The foregoing objects are provided by the present invention, which provides apparatus and method for a tiltable steering handlebar for snowmobiles and ATVs. The present invention can be an option on newly manufactured snowmobiles and ATVs or can be manufactured and sold as a retrofit kit for existing snowmobiles and ATVs.

The present invention provides a handlebar tilting apparatus having upper and lower brackets, a lever, and appropriate connectors to fasten the brackets and lever to each other in accordance with the present invention. In the embodiment shown in the Figures, the brackets, while not identical, each adopt a generally U-shaped configuration with opposing side members and a transition member extending therebetween and integral therewith. As shown, the lower bracket is sized appropriately to be received between the opposing sides of the upper bracket. The lower bracket is stationary and is non-rotationally attached to the steering column of the snowmobile or ATV in any known manner. The upper bracket is attached to the handlebar of the snowmobile or ATV. A hinge pin pivotally attaches the two brackets to each other. The lever is pivotally attached to the upper bracket by a lever pin. The lower bracket may have a plurality of notches along the upper edges of its sides that are configured to receive a latching pin carried by the lever. Pivoting the lever relative to the upper bracket engages and disengages the latch pin with respect to the notches in the lower bracket sides, thus allowing the upper bracket to pivot forwardly and rearwardly relative to the lower bracket and the vehicle. Since the handlebar is carried by the upper bracket, it will pivot along with the upper bracket, thus pivoting the handlebar relative to the vehicle and its operator. Appropriately sized springs may be used to control the action of the lever as well as to counterbalance the action of the upper bracket and the handlebar.

In a method in accord with the present invention, a handlebar is tilted relative to its previous position to the vehicle and its operator by providing nesting upper and lower, pivotally attached U-shaped brackets with the lower bracket being attached to the stationary steering column of the vehicle and the upper bracket being attached to the handlebar; providing a lever pivotally attached to the upper bracket, the lever having a latch pin engaging notches on the lower bracket; pivoting the lever to disengage the latch pin from the lower bracket notches; tilting the upper bracket relative to the lower bracket thereby pivoting the handlebar relative thereto and to the vehicle and its operator; and pivoting the lever to re-engage the latch pin with different lower bracket notches.

The preferred embodiments of the inventions are described in the following Detailed Description. Unless specifically noted, the words and phrases in the specification and claims are intended to have their ordinary and accustomed meaning to those of ordinary skill in the applicable arts. If any other meaning is intended, the specification will specifically state that a special meaning is being applied to a word or phrase. Likewise, the use of the words "function" or "means" in the Detailed Description is not intended to indicate a desire to invoke the special provisions of 35 U.S.C. Section 112, paragraph 6 to define the invention. To the contrary, if the provisions of 35 U.S.C. Section 112, paragraph 6, are sought to be invoked to define the inventions, the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. Section 112, paragraph 6. Moreover, even if the provisions of 35 U.S.C. Section 112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

The present invention, as well as its various features and advantages, will become evident to those skilled in the art when the following description of the invention is read in conjunction with the accompanying drawings as briefly described below and the appended claims. Throughout the drawings, like numerals refer to similar or identical parts.

BRIEF DESCRIPTION OF THE DRAWINGS

FIG. 3 depicts the handlebar tilt apparatus of FIG. 1 in a side elevation view.

FIG. 4 shows a cross-sectional view of the handlebar tilt apparatus of FIG. 1 taken along viewing plane 4—4 of FIG. 2.

FIG. 5 illustrates the handlebar tilt apparatus shown in FIG. 1 wherein it is disposed in the forwardmost tilted position.

FIG. 6 depicts the handlebar tilt apparatus shown in FIG. 1 in its rearwardmost tilt position.

DETAILED DESCRIPTION OF THE INVENTION

Figure 1:
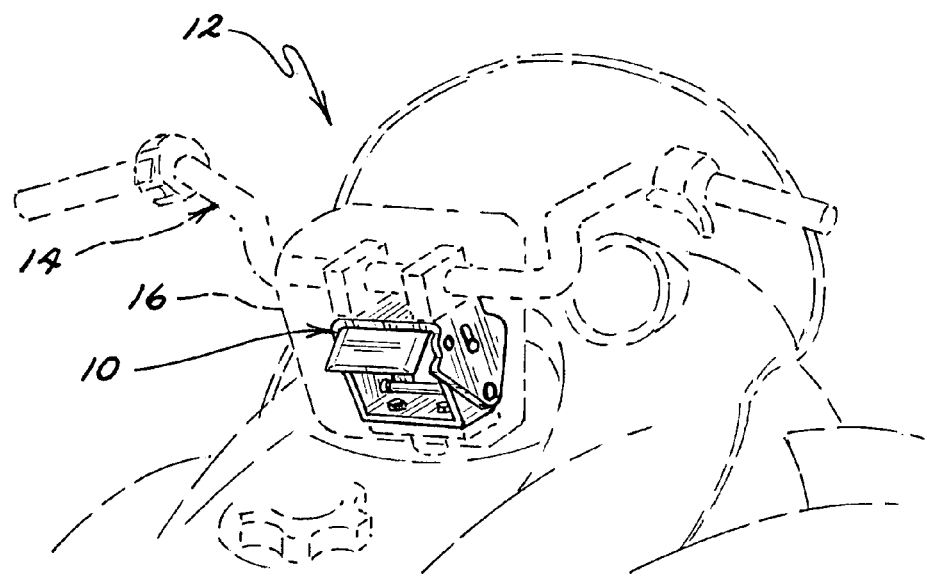
FIG. 1 illustrates a handlebar tilt apparatus in accord with the present invention positioned for use on a vehicle such as a snowmobile or an ATV.

The present invention will be described with reference to FIGS. 1–6. A handlebar tilt apparatus 10 is shown attached to a vehicle 12 that utilizes a handlebar 14 for steering. Vehicle 10 is indicated in phantom and should be understood to be a generic representation of vehicles that utilize handlebars for steering. Apparatus 10 will typically be housed in a "boot" 16 made of a synthetic material, though any material appropriate for such use may be used.

In the description that follows below, it will be understood that the "forward" direction refers to the forward end of the vehicle 12 and that "rearward" direction refers to the rearward end of the vehicle.

Apparatus 10 includes upper and lower brackets 20 and 22, respectively. Upper bracket 20 includes opposing upper bracket side members 24 and 26 and upper bracket attachment member 28 extending between the side members 24 and 26. The side members 24 and 26 extend generally downwardly from the member 28 when attached to a vehicle 12. Upper bracket 20 also includes a spring attachment member or tab 30 (best seen in FIGS. 3–6) extending forwardly from the bracket 20. Tab 30 includes a through hole 31 which may be used to attach a spring to the upper bracket as described further below. As shown in the Figures, upper bracket 20 is formed as an integral structure, though each of the members 24–30 could be formed individually and attached to each other in any known manner, such as by welding.

Upper bracket side member 24 includes a slot 32 that extends therethrough from the outer surface 34 thereof to the inner surface 36 thereof. Similarly, upper bracket side member 26 includes a slot 38 that extends therethrough from the outer surface 40 thereof to the inner surface 42 thereof.

As seen in the Figures, the handlebar 14 is attached to the upper bracket handlebar attachment member 28 in any known manner, including but not limited to bolting or welding.

Lower bracket 22 includes opposing lower bracket side members 50 and 52 and lower bracket attachment member 54 extending between the side members 50 and 52. The side members 50 and 52 extend generally upwardly from the member 54 when attached to a vehicle 12. Lower bracket 22 also includes a lower bracket spring attachment tab 56 having a through hole 58 that may be utilized in the attachment of a spring to the lower bracket as will be described below in greater detail. As shown in the Figures, lower bracket 22 is formed as an integral structure, though each of the members 50–56 could be formed individually and attached to each other in any known manner, such as by welding.

As seen in the Figures, the steering column 62 is attached to the upper bracket handlebar attachment member 54 in any known manner, including but not limited to bolting or welding. This attachment between the member 54 and the steering column 62 is a fixed, non-rotational attachment. Thus, rotation or turning of the handlebar 14 will cause the simultaneous rotation of the tilt apparatus 10 and the steering column 62.

Each lower bracket side member 50 and 52 includes an upper edge 66 and 68, respectively, each of which in turn includes a plurality of tilt adjustment notches 70. These notches 70 are utilized during the handlebar tilting process as will be described below.

Figure 2:
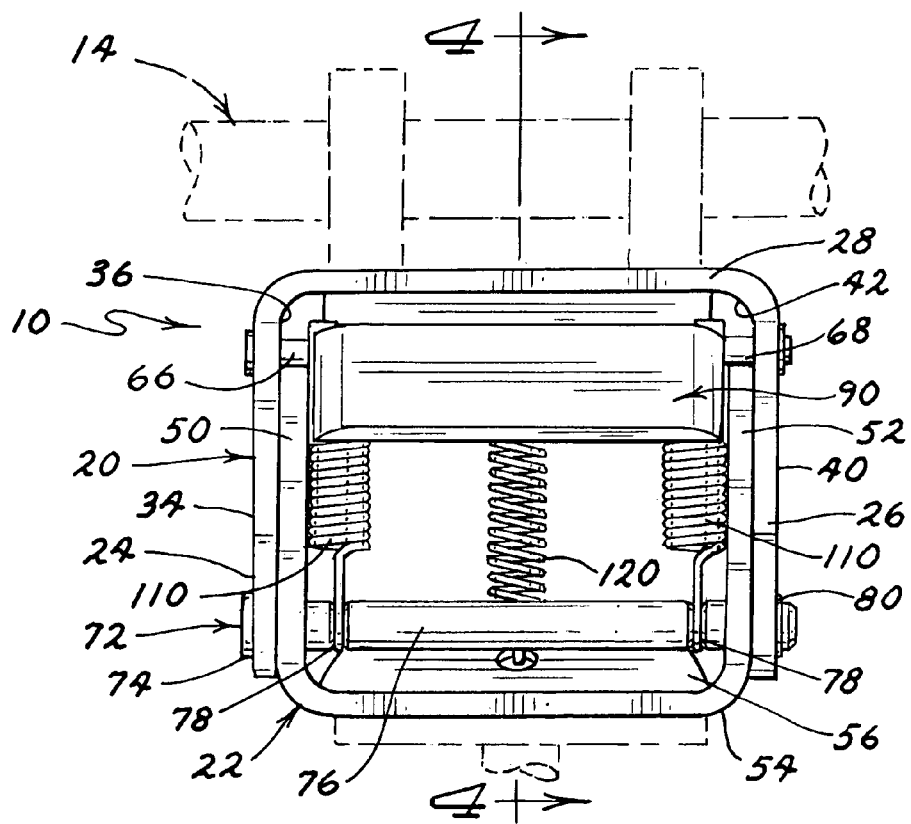
FIG. 2 illustrates the handlebar tilt apparatus of FIG. 1 in a front plan view

Upper and lower brackets 20 and 22 are pivotally attached to each other. To form this pivotal attachment, each of the bracket side members includes appropriately sized and located through holes (not shown for purposes of clarity) configured to receive a hinge pin 72. As best seen in FIG. 2, the hinge pin 72 includes a hinge pin head 74 and a shaft 76. The shaft 76 may included a pair of circumferentially extending grooves 78. The shaft may also include a third circumferential groove, not shown in the Figures for purposes of clarity, that is configured to receive a hinge pin retaining ring 80 (FIG. 2). Thus to pivotally attach the upper and lower brackets together, the pin 72 will be inserted through aligned bracket side member through holes and the hinge retaining pin 80 will be attached to the shaft 76.

Handlebar tilting apparatus 10 also includes a lever 90 that is useful for tilting the upper bracket 20 relative to the lower bracket 22, and hence the handlebar 14 relative to the vehicle 12. Lever 90 is pivotally attached to the upper bracket 20. Lever 90 includes a pair of opposing side plates 92, 94 each including a through hole 96 configured to receive a lever pin 98 and a through slot 100 configured to receive a latch pin 102. Slot 100 is provided to facilitate the tilting or pivoting action of the lever 90 by providing some "play" in the motion of the latch pin 102. That is, the latch pin 102 is able to slide within the slot 100 as the lever 90 is pivoted and thereby prevents substantial binding or interference between the latch pin 102 and the slots 32 and 38, which could otherwise make movement of the lever 90 and thereby the tilting motion difficult for the operator. The lever pin 98 and latch pin 102 can each be retained in position by any known means such as retaining rings or push nuts. The lever 90 also includes a push plate 104 that extends between the side plates 92 and 94. Push plate 104 preferably has a substantially planar configuration that is presented towards the rear of the vehicle 12.

As best seen in FIGS. 2 and 4, tilt apparatus 10 may include one or more latch springs 110. Latch springs 110 are attached at one end to the shaft 76 of the hinge pin 72. As shown, each spring includes a hooked end 112 that is received by the circumferential groove 78 of the hinge pin 72. The other end of each spring 110 also includes a hooked end 114 that is hooked over the latch pin 102. The latch pin 102 may also include circumferential grooves akin to those on the hinge pin 72 if desired. Such circumferential grooves aid in maintaining the position of the springs relative to the pins 72 and 102 at the desired locations. It will be observed that the latch pin 102 has a length that exceeds the width not only of the lower bracket but also the upper bracket. That is, the ends of the latch pin 102 extend through the slots 32 and 38, which guide the motion of the latch pin as the lever is pivoted, thus enabling the ends of the latch pin 102 to selectively engage the notches 70. During the pivoting motion of the lever 90 to unlatch the pin 102 from the notches, the ends of the latch pin 102 will slide upward in the slots 32 and 38 of the upper bracket sides 24 and 26, respectively. Conversely, as the push plate pivots back upwardly returning the latch pin into a notch engagement, the ends of the pin 102 will slide downward within the slots 32 and 38. Stated otherwise, the lever 90 is operatively engaged with the latch pin 102 such that pivoting the lever causes the simultaneous engagement of the latch pin, guided within the slots 32, 38 of the upper bracket 20, with a selected opposing pair of notches 70 in the lower bracket, thus latching or locking the brackets together.

Apparatus 10 may also include one or more counterbalance springs 120. Such springs 120 will be attached at one end to the spring tab 30 of the upper bracket 20 and at the other end to the spring tab 56 of the lower bracket 22. As shown in the present embodiment of the invention, only one such counterbalance spring 120 is utilized, though more such springs could be if desired.

With the present invention having been described, its operation relative to the embodiment shown in the Figures can be discussed. When an operator of a vehicle 12 wishes to change the angle of the handlebar 14 relative to the vehicle, the operator can push as indicated by arrow 130 (FIG. 3) on the push plate 104 of the lever 90 through the boot 16, pivoting the push plate 104 downwardly about its pivotal connection through the lever pin 98 to the upper bracket 20. This pivoting motion will cause the forward end 122 of the lever 90 to pivot upwardly, disengaging the latch pin 102 from the notch 70. Removing the latch pin 102 from the notches 70 frees the upper bracket 20 to pivot about its hinged attachment through hinge pin 72 relative to the lower bracket 22, thus changing the angle of the handlebar 14 relative to the operator. Referring specifically to FIGS. 3 and 4, the unlatched position 124 of the lever 90 is shown in phantom outline after the latch pin has been disengaged from a notch 70.

As shown in the Figures, three sets of opposed notches 70 are provided in the upper edges 66 and 68 of lower bracket sides 50 and 52, respectively, thus enabling the upper bracket to assume three separate angular positions relative to the lower bracket; that is, the handlebar 14 may be tilted to three positions relative to the vehicle 12. The range of tilting motion of the upper bracket/handlebar is shown in FIG. 3 by the double-headed arrow 132. The forwardmost tilt of the handlebar 14 is shown in FIG. 5, the central position of the handlebar is shown in FIG. 4, and the rearwardmost tilt is shown in FIG. 6. It will be understood that fewer or greater tilt positions can be provided by the present invention by decreasing or increasing the number of notches and changing the size of the latch pin 102 accordingly.

During normal operation, the latch pin is held in place in a selected one of the notches by the biasing or retraction action of the latch springs 110. Pivoting the lever 90 to disengaged the latch pin 102 will cause the latch springs 110 to elongate, creating a restoring force in the springs 110 that acts to pull the latch pin 102 into engagement with one of the notches 70 and prevent its unintentional disengagement from the selected pair of notches 70 during operation of the vehicle.

One or more counterbalance springs 120 are attached, as noted earlier, to the spring tabs 30 and 56 of the upper bracket 20 and lower bracket 22, respectively. As shown, only one such spring 120 is utilized in the embodiment shown in the Figures, though more could be used if desired. It will be observed by comparison in order of FIGS. 5, 4, and 6, that as the handlebar 14 is tilted rearwardly toward the operator that the counterbalance spring 120 is extended, thus exerting a biasing force that seeks to return the handlebar to the forwardmost position shown in FIG. 5. These springs 120 may be provided to balance the motion and weight of the handlebar 14.

As shown in the Figures, an embodiment of the present invention can be manufactured of sheet metal of the appropriate thickness and strength. Each of the brackets and the lever can be punched out as an integral part and manipulated in known manner to form the appropriate configuration, or could be formed as individual parts and then attached in any known, appropriate manner.

It will be obvious to those skilled in the art that many modifications may be made within the scope of the present invention without departing from the spirit of thereof, and that the invention includes all such modifications.

What is claimed is:

1. Apparatus providing a tilting action to a handlebar used to steer a vehicle, said apparatus comprising:
    a first and a second nesting bracket, wherein one of said first and second brackets is stationary and attached to the vehicle and the other of said first and second brackets is attached to the handlebar, said first and second brackets being pivotally attached to each other;
    a lever, wherein said lever is pivotally attached to one of said brackets, said lever carrying a latch pin, and wherein and said other bracket includes a plurality of notches capable of receiving said latch pin;
    wherein pivoting said lever causes said latch pin to disengage from said notches and enables said brackets to be pivoted relative to each other.

2. The apparatus of claim 1 and further including a hinge pin for pivotally attaching said brackets to each other.

3. The apparatus of claim 2 and further including a lever pin for pivotally attaching said lever to said one of said brackets.

4. The apparatus of claim 3 and further including at least one latch spring extending between said hinge and latch pins, said at least one latch spring being provided to bias said latch pin within said notches.

5. The apparatus of claim 1 and further including a counterbalance spring extending between said brackets.

6. The apparatus of claim 1 wherein said brackets have substantially a U-shaped configuration.

7. The apparatus of claim 1 wherein said lever includes slots receiving said latch pin.

8. The apparatus of claim 7 and further including a counterbalance spring extending between said upper and lower brackets.

9. The apparatus of claim 8 wherein said upper bracket includes an upper bracket spring tab extending from said upper bracket and said lower bracket includes a lower bracket spring tab extending from said lower bracket and wherein said counterbalance spring is attached at its opposing ends to said upper and lower bracket spring tabs.

10. Apparatus for use with a vehicle, the vehicle including a handlebar for steering and further including a steering column, said apparatus being provided for tilting the handlebar and comprising:

a lower bracket including opposed lower bracket sides and a lower bracket attachment member extending between said lower bracket sides, said lower bracket attachment member being provided for attachment to the steering column of the vehicle and said lower bracket sides including an upper edge with a plurality of notches disposed therein;

an upper bracket including opposed upper bracket sides and an upper bracket attachment member extending between said upper bracket sides, said upper bracket attachment member being provided for attachment to the handlebar of the vehicle and being pivotally attached to said lower bracket;

a lever including opposed lever side plates and a lever push plate extending between said lever side plates, said lever pivotally attached to said upper bracket and carrying a latch pin selectively engagable with said lower bracket notches;

wherein pivoting said lever to disengage said latch pin from said notches enables said upper bracket and the handlebar to be tilted relative to the lower bracket and the vehicle.

11. The apparatus of claim 10 wherein said brackets are pivotally attached to each other by a hinge pin extending through said upper and lower bracket sides.

12. The apparatus of claim 11 and further including at least one latch spring extending between said hinge pin and said latch pin.

13. The apparatus of claim 10 wherein said upper bracket sides each include a slot and said latch pin includes latch pin ends, said latch pin ends extending through said slot and slidable relative thereto as said lever is pivoted.

14. The apparatus of claim 13 wherein said brackets are pivotally attached to each other by a hinge pin extending through said upper and lower bracket sides.

15. The apparatus of claim 14 and further including at least one latch spring extending between said hinge pin and said latch pin.

16. The apparatus of claim 13 and further including a counterbalance spring extending between said upper and lower brackets.

17. The apparatus of claim 16 wherein said upper bracket includes an upper bracket spring tab extending from said upper bracket and said lower bracket includes a lower bracket spring tab extending from said lower bracket and wherein said counterbalance spring is attached at its opposing ends to said upper and lower bracket spring tabs.

18. The apparatus of claim 10 wherein said lever includes slots receiving said latch pin.

19. A method for providing a tilting action to a handlebar used to steer a vehicle, wherein the vehicle includes a stationary steering column, said method comprising:

providing nesting upper and lower, pivotally attached U-shaped brackets with the lower bracket being attached to the stationary steering column of the vehicle and the upper bracket being attached to the handlebar;

providing a plurality of positioning notches on the lower bracket;

providing a lever pivotally attached to the upper bracket, the lever having a latch pin engaging the notches on the lower bracket;

pivoting the lever to disengage the latch pin from the lower bracket notches;

tilting the upper bracket relative to the lower bracket thereby pivoting the handlebar relative thereto and to the vehicle and an operator of the vehicle; and pivoting the lever to re-engage the latch pin with different lower bracket notches.

20. The method of claim 19 including:

providing slots in the upper bracket for receiving the latch pin and guiding its motion.

21. A tiltable handlebar apparatus for tilting a handlebar of a vehicle using such for steering, said apparatus comprising:

a handlebar;

a lower bracket including opposed lower bracket sides and a lower bracket attachment member extending between said lower bracket sides, said lower bracket attachment member being provided for attachment to a steering column of the vehicle and said lower bracket sides including an upper edge with a plurality of notches disposed therein;

an upper bracket including opposed upper bracket sides and an upper bracket attachment member extending between said upper bracket sides, said upper bracket attachment member being attached to said handlebar of the vehicle and being pivotally attached to said lower bracket;

a lever including opposed lever side plates and a lever push plate extending between said lever side plates, said lever pivotally attached to said upper bracket and carrying a latch pin selectively engagable with said lower bracket notches;

wherein pivoting said lever to disengage said latch pin from said notches enables said upper bracket and said handlebar to be tilted relative to the lower bracket and the vehicle.

22. The apparatus of claim 21 including:

providing slots in the upper bracket for receiving the latch pin and guiding its motion as the lever is pivoted.

\* \* \* \* \*